United States Patent
Moon et al.

(10) Patent No.: US 9,667,277 B2
(45) Date of Patent: May 30, 2017

(54) APPARATUS FOR TUNING VOLTAGE STANDING WAVE RATIO OF BASE STATION SYSTEM IN WIRELESS COMMUNICATION NETWORK

(71) Applicant: KMW Inc., Hwaseong, Gyeonggi-Do (KR)

(72) Inventors: Young-Chan Moon, Gyeonggi-Do (KR); Sung-Hwan So, Gyeonggi-Do (KR); In-Ho Kim, Gyeonggi-Do (KR); Oh-Seog Choi, Gyeonggi-Do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 0 days.

(21) Appl. No.: 14/845,806

(22) Filed: Sep. 4, 2015

(65) Prior Publication Data

US 2015/0381212 A1 Dec. 31, 2015

Related U.S. Application Data

(63) Continuation of application No. PCT/KR2014/001845, filed on Mar. 6, 2014.

(30) Foreign Application Priority Data

Mar. 6, 2013 (KR) .................. 10-2013-0024043

(51) Int. Cl.
*H04B 1/40* (2015.01)
*H04B 1/00* (2006.01)
(Continued)

(52) U.S. Cl.
CPC .............. *H04B 1/006* (2013.01); *H01Q 3/12* (2013.01); *H01Q 21/26* (2013.01); *H04B 1/525* (2013.01); *H01Q 1/246* (2013.01)

(58) Field of Classification Search
CPC .......... H01Q 1/246; H01Q 21/26; H01Q 3/12; H04B 1/006; H04B 1/525; H04B 1/40;
(Continued)

(56) References Cited

U.S. PATENT DOCUMENTS

| | | | | |
|---|---|---|---|---|
| 5,592,185 A | * | 1/1997 | Itabashi | H01Q 3/2682 343/767 |
| 7,865,145 B2 | * | 1/2011 | Neustadt | H04B 17/318 455/161.3 |
| 8,380,239 B2 | * | 2/2013 | Liu | H04B 17/102 455/115.1 |
| 8,712,348 B2 | * | 4/2014 | Brobston | H04B 1/0458 455/115.1 |

(Continued)

FOREIGN PATENT DOCUMENTS

| | | |
|---|---|---|
| EP | 0618639 A2 | 10/1994 |
| JP | H10112625 A | 4/1998 |
| JP | 2003338704 A | 11/2003 |
| JP | 2007110331 A | 4/2007 |
| JP | 2007194961 A | 8/2007 |
| KR | 10-2001-0046046 A | 6/2001 |
| KR | 10-2001-0077402 A | 8/2001 |
| KR | 10-2003-0038648 A | 5/2003 |
| KR | 10-2010-0136651 A | 12/2010 |

(Continued)

OTHER PUBLICATIONS

JP Office Action issued on Sep. 22, 2016 in corresponding Japanese Patent Application No. 2015-561272.

(Continued)

*Primary Examiner* — Nhan Le
(74) *Attorney, Agent, or Firm* — Mintz Levin Cohn Ferris Glovsky and Popeo, P.C.; Kongsik Kim; Colleen H. Witherell

(57) ABSTRACT

Provided is an apparatus for tuning the voltage standing wave ratio (VSWR) of a base station system in a wireless communication network, the apparatus comprising: a VSWR changing unit for changing the characteristics of the VSWR of an antenna by changing electrical signal transmission characteristics of an internal power feedline by means of an external operation, or by changing the characteristics for transceiving a radiating member; a driving unit for driving the VSWR changing unit in accordance with a control signal; a VSWR detection unit for detecting the corresponding VSWR for the installed antenna and generating a detection signal on the basis thereof; and a control unit for controlling the actions of the VSWR changing unit for changing the VSWR characteristics by controlling the operation of the driving unit, if a VSWR characteristic is (Continued)

determined to be in an abnormal state on the basis of the detection signal generated by the VSWR detection unit.

4 Claims, 5 Drawing Sheets

(51) Int. Cl.
*H01Q 3/12* (2006.01)
*H01Q 21/26* (2006.01)
*H04B 1/525* (2015.01)
*H01Q 1/24* (2006.01)

(58) Field of Classification Search
CPC ........ H04B 1/3822; H04B 1/406; H04B 1/44; H04B 1/54; H04B 2001/0416; H04B 17/0025; H03G 3/3042; H03G 3/3047; H03F 3/24; H03F 1/0205
USPC ...... 455/77, 115.1–115.3, 127.1, 127.5, 423, 455/424, 550.1, 561, 562.1
See application file for complete search history.

(56) References Cited

U.S. PATENT DOCUMENTS

| | | | |
|---|---|---|---|
| 2005/0253669 A1* | 11/2005 | Tillery | H01P 1/184 333/161 |
| 2011/0105023 A1 | 5/2011 | Scheer et al. | |

FOREIGN PATENT DOCUMENTS

| | | |
|---|---|---|
| KR | 10-2012-0120751 A | 11/2012 |
| KR | 10-2014-0069971 A | 6/2014 |

OTHER PUBLICATIONS

EP Office Action issued on Sep. 23, 2016 in corresponding European Patent Application No. 14760423.5.
CN Office Action issued on Oct. 9, 2016 in corresponding Chinese Patent Application No. 201480010482.7.

* cited by examiner

APPARATUS FOR TUNING VOLTAGE STANDING WAVE RATIO OF BASE STATION SYSTEM IN WIRELESS COMMUNICATION NETWORK

CROSS REFERENCE TO RELATED APPLICATIONS

This application is a continuation of International Application No. PCT/KR2014/001845 filed on Mar. 6, 2014, which claims priority to Korean Application No. 10-2013-0024043 filed on Mar. 6, 2013, which applications are incorporated herein by reference.

TECHNICAL FIELD

The present disclosure relates to a technology for a base station, a relay station, and a small-sized base station (hereinafter, referred to as a "base station system") which are wireless access nodes in a wireless communication (PCS, Cellular, CDMA, GSM, LTE, or the like) network and, more particularly, to a Voltage Standing Wave Ratio (VSWR) tuning apparatus in a base station system.

BACKGROUND ART

A base station system in a wireless communication network may include an antenna installed through a pillar at a high position such as a rooftop of a building or a tower, a base station main body installed on the ground (because it has a large volume and a heavy weight), and a feeder cable which connects the antenna and the base station main body.

The base station main body performs a basic transmission and reception RF signal processing operation, transmits an RF signal through the feeder cable, and the antenna includes an array of multiple transmission and reception radiation elements to transmit and receive a wireless signal. In this event, in order to reduce the loss of a signal on the feeder cable between the base station main body and the antenna, a booster, which refers to a Tower Mounted Amplifier (TMA) or a Remote Radio Head (RRH), is installed in a proximity position of the antenna (e.g., on the bottom of the antenna).

Further, the base station system commonly includes devices for remotely controlling a status of beams radiated from an antenna, for example, a Remote Azimuth Steering (RAS) device for remotely adjusting azimuth steering, a Remote Azimuth Beamwidth (RAB) device for remotely adjusting a beam width of an azimuth, and a Remote Electrical Tilt (RET) device for electronically adjusting a down tilt angle. In order to control the antenna in the base station main body, an Antenna Interface Standards Group (AISG) v2.1.0 was proposed and a communication scheme through a 3rd Generation Partnership Project (3GPP) protocol has also been proposed.

In addition, various diagnosis equipment for determining whether the antenna is in a normal state or an abnormal state by measuring a radiation performance and characteristic of the antenna may be installed in the base station system, wherein the diagnosis equipment provides a technology for determining whether the antenna is in the normal state by detecting, for example, a Voltage Standing Wave Ratio (VSWR) of the antenna. That is, a measurement unit for measuring the VSWR is included in the antenna and the base station main body receives a measurement signal of the VSWR measurement unit and then when it is considered that the antenna is not in the normal state, generates an alarm signal according to this. The generated alarm signal is provided to a side of a provider through a base station controller and then an operation of checking and replacing a base station antenna, which is considered to be in the abnormal state, is performed.

However, in order to check and replace the base station antenna considered to be in abnormal state, an operator is required to directly check and replace a base station system installed in a corresponding area, which causes a difficulty in the working and requires a considerably long time for the working.

SUMMARY

Therefore, an aspect of the present disclosure is to enable a VSWR matching of a base station antenna to be automatically optimized and enable VSWR characteristics to be normalized, thereby making an operation for checking and replacing the base station antenna be unnecessary. Further, the aspect of the present disclosure is to provide a voltage standing wave ratio tuning apparatus of a base station system in a wireless communication network such that the resource waste according to the replacement of the base station antenna is reduced.

In accordance with an aspect of the present disclosure, there is provided a voltage standing wave ratio (VSWR) tuning apparatus of a base station system in a wireless communication network. The VSWR tuning apparatus includes: a VSWR conversion unit that converts VSWR characteristics of an antenna by converting electrical signal transmission characteristics of an internal feed line by an external drive or converting radiation element transmission and reception characteristics; a driving unit that drives the VSWR conversion unit according to a control signal; a VSWR detection unit that generates a detection signal by detecting a VSWR of a corresponding installed antenna; and a controller that controls a conversion operation of the VSWR characteristics of the VSWR conversion unit by controlling an operation of the driving unit when it is determined that the VSWR characteristics are in an abnormal state according to the detection signal generated in the VSWR detection unit.

The VSWR detection unit provides a VSWR detection signal to a base station main body and the controller controls the VSWR characteristic conversion operation by a command for a VSWR characteristic control provided from the base station main body.

The VSWR conversion unit includes: first and second stubs that are included in a feeding line connected to a radiation element; and first and second auxiliary lines that are connected to the first and second stubs, respectively, in a capacitance coupling scheme, wherein the first and second auxiliary lines are configured to be movable by the operation of the driving unit and the amount of the capacitance coupling between the first and second auxiliary lines and the first and second stubs, respectively, changes by the movement of the first and second auxiliary lines.

The VSWR conversion unit may include: a dielectric that puts on a Feeding Line (FL) connected to a radiation element and has a high dielectric constant; and a dielectric moving unit that supports the dielectric and is configured to be movable according to the FL by the operation of the driving unit.

The VSWR conversion unit may include: a beam forming aiding material that is installed in a spaced distance in a radiation direction of the radiation element and is configured by a thin metal body; and a movement support part that movably supports the beam forming aiding material to be near or be away from the radiation element, and is configured to be movable the beam forming aiding material by the operation of the driving unit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
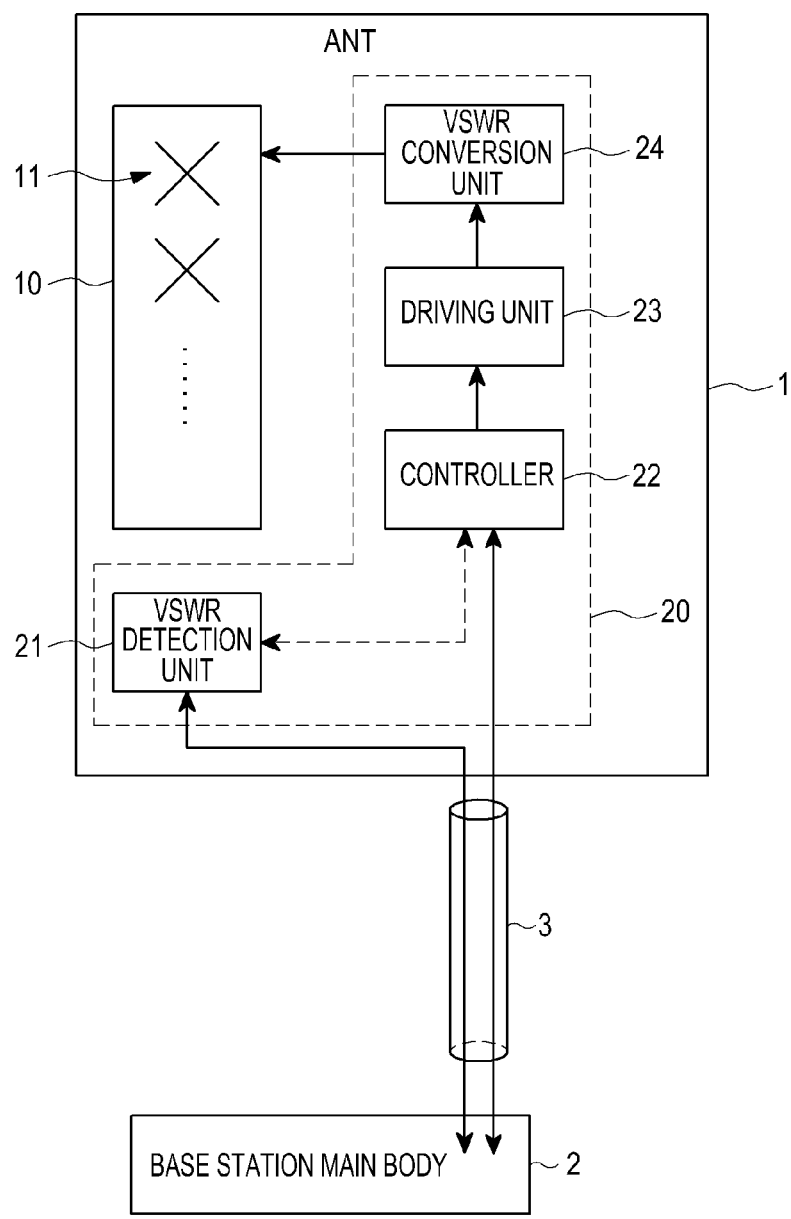
FIG. 1 is a block diagram illustrating a voltage standing wave ratio tuning apparatus and related elements of a base station system in a wireless communication network according to an embodiment of the present disclosure.

Hereinafter, exemplary embodiments of the present disclosure will be described in detail with reference to the accompanying drawings. Various specific definitions found in the following description are provided only to help general understanding of the present invention, and it is apparent to those skilled in the art that the present invention can be implemented without such definitions. In the accompanying drawings and the descriptions relating thereto, identical elements are indicated by identical reference numerals where possible.

FIG. 1 is a block diagram illustrating a voltage standing wave ratio tuning apparatus and related elements of a base station system in a wireless communication network according to an embodiment of the present disclosure. Referring to FIG. 1, a Voltage Standing Wave Ratio (VSWR) tuning apparatus 20 according to an embodiment of the present disclosure is installed in an antenna 1 of a base station system. As the prior art, the antenna 1 includes at least one radiation element 11, which transmits a transmission signal and receives a reception signal, and a reflecting plate 11 in which the radiation element 11 is installed, may be installed through a pillar at a high position such as a rooftop of a vertical building or a tower, and is connected to a base station main body 2 through an electronic cable 3 to exchange a transmission and reception signal, a control signal, and other operation related signals The VSWR tuning apparatus 20 includes: a VSWR conversion unit 24 for converting a VSWR characteristic of the corresponding antenna 1 by converting electrical signal transmission characteristics of an internal feed line by an external drive or converting radiation element transmission and reception characteristics; a driving unit 23 for driving the VSWR conversion unit 24 according to a control signal; a VSWR detection unit 21 for generating a detection signal by detecting a VSWR of a corresponding installed antenna 1; and a controller 22 for controlling a conversion operation of the VSWR characteristics of the VSWR conversion unit 24 by controlling the driving of the driving unit 23 when the VSWR characteristics are determined to be in an abnormal state according to the detection signal generated in the VSWR detection unit 21

FIG. 1 illustrates an example of a configuration in which the VSWR detection unit 21 provides a VSWR detection signal to a base station main body 3, the detection signal of the VSWR detection unit 21 is received in the base station main body 3 to identify VSWR characteristics thereof, and the VSWR detection unit 21 provides a command for a VSWR characteristic control to the controller 22 of the VSWR tuning apparatus 20 in order to convert the VSWR characteristics when it is determined that the VSWR characteristics are in the abnormal state. In this event, the base station main body 3 terminates a VSWR characteristic adjustment operation when the VSWR characteristics are in normal state and belong to a pre-configured reference value through the detection signal of the VSWR detection unit 21, while adjusting the VSWR characteristics through the VSWR tuning apparatus 20, and the VSWR tuning apparatus 20 maintains a current VSWR tuning state. Further, in this event, the base station main body 3 may generate an alarm signal when the VSWR detection signal of the VSWR detection unit 21 is continuously in the abnormal state even after sufficiently (i.e., over a preconfigured VSWR characteristic variable overall range) performing the VSWR characteristic adjustment operation.

Figure 2:
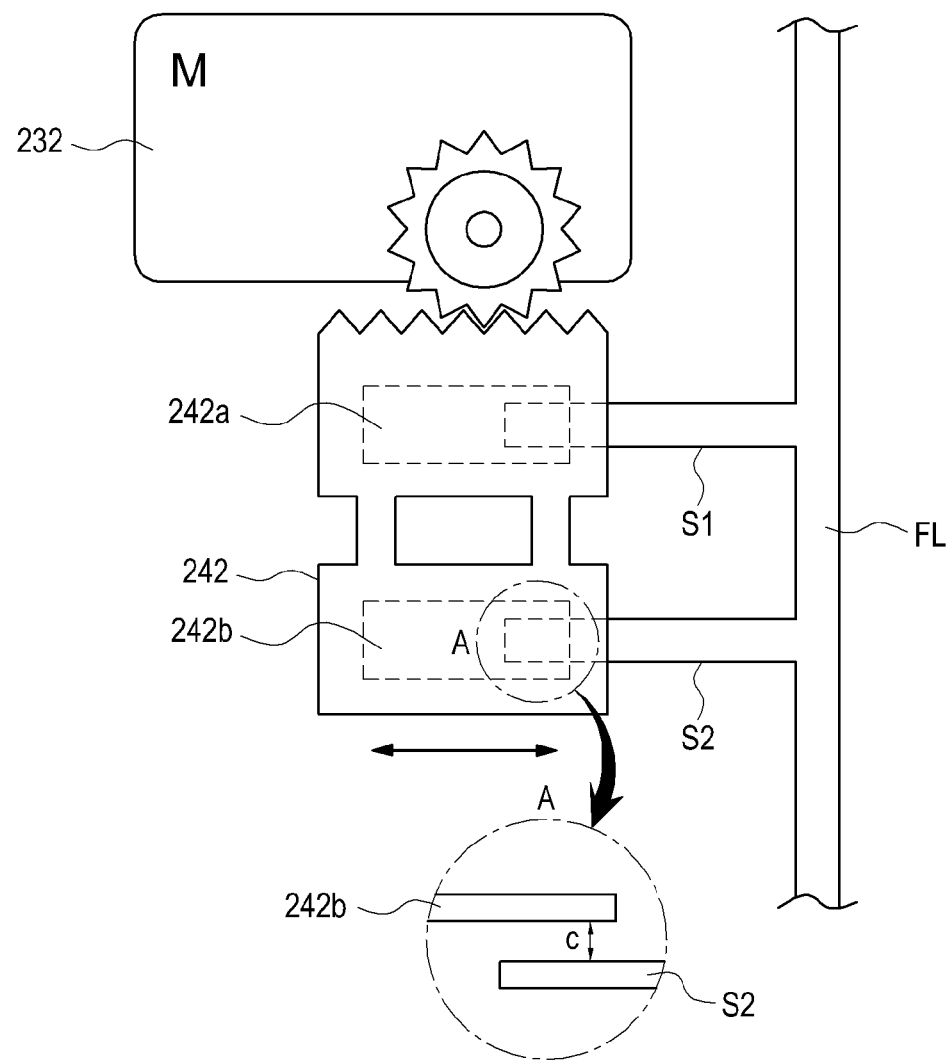
FIG. 2 illustrates a first example detailed structure of a VSWR conversion unit and a driving unit in FIG. 1.
Figure 3:
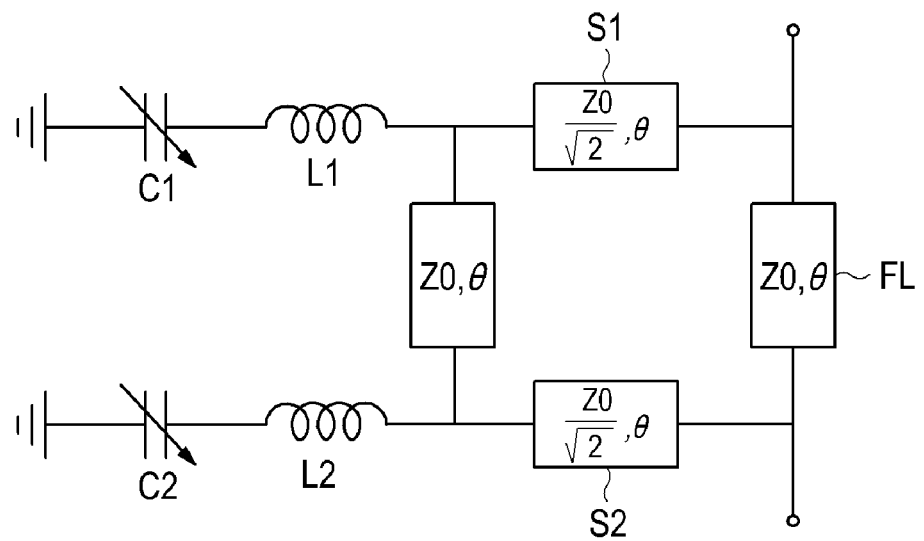
FIG. 3 illustrates an equivalent circuit diagram of a VSWR conversion unit in FIG. 2.

Meanwhile, besides the configuration, another embodiment of the preset invention may have a configuration in that the VSWR detection unit 21 additionally and directly provides the VSWR detection signal to the controller 22 of the VSWR tuning apparatus 20 and in this event, the controller 22 receives the detection signal of the VSWR detection unit 21 and then performs a control operation for converting the VSWR characteristics when it is considered that the VSWR characteristics are in the abnormal state. The controller 22 may generate the alarm signal to the base station main body 2 when the VSWR detection signal of the VSWR detection unit 21 is continuously in the abnormal state after sufficiently performing an operation of adjusting the VSWR characteristics FIG. 2 illustrates a first example detailed structure of a VSWR conversion unit and a driving unit in FIG. 1 and FIG. 3 illustrates an equivalent circuit diagram of a VSWR conversion unit in FIG. 2. Referring to FIGS. 2 and 3, a VSWR conversion unit according to an embodiment of the present disclosure includes: first and second stubs S1 and S2, each of which is installed in a Feeding Line (FL) connected to radiation element(s) in an antenna; first and second auxiliary lines 242a and 242b which are connected to the first and second stubs S1 and S2, respectively, in a capacitance coupling scheme; and a line variable part 242 which supports the first and second auxiliary lines 242a and 242b, is configured to be movable by an operation of a driving motor 232 which is a main element of the driving unit 23, and has a structure having a capacitance coupling, the amount of which is variable at the time of moving.

The first and second auxiliary lines 242a and 242b put according to the direction of the first and second stubs S1 and S2, respectively, wherein the first and second stubs S1 and S2 and the first and second auxiliary lines 242a and 242b are implemented to have a capacitance coupling area (c) while both ends partially overlap. An "A" area which is enlarged by a circular one-dot-chain line in FIG. 2 illustrates a side structure of the second stub S2 and the second auxiliary line 242b.

When a movement direction of the line variable unit 242 moves according to the direction on which the first and second stubs S1 and S2 put, a rotational force by the driving motor 232 using a rack and pinion gear structure may be configured to move the line variable unit 242 right and left.

According to a movement of the line variable unit 242, the capacitance coupling area (c) between the first and second stubs S1 and S2 and the first and second auxiliary lines 242a and 242b is variable. Further, the first and second stubs S1 and S2 are designed to have a distance of 8/λ, with reference to the processing frequency between them.

If the structure is described, it is identified that a frequency matching may be performed with reference to the VSWR by an inductor component by the first and second stubs S1 and S2 and the first and second auxiliary lines 242a and 242b, and a variable capacitance component for the variable capacitance coupling area (c) between the first and second stubs S1 and S2 and the first and second auxiliary lines 242a and 242b.

That is, the Voltage Standing Wave Ratio (VSWR) refers to a high ratio of a standing wave (i.e., a fixed waveform generated by combining a traveling wave with a reflected wave) which is generated by reflection from the antenna and the VSWR characteristics may escape from a normal range in a specific frequency band. In this event, when an operation of matching variable frequencies is performed using the VSWR tuning apparatus having the structure, the VSWR characteristics may be adjusted within a normal value in a frequency band which escapes from the corresponding normal range while the standing wave is variable.

Referring to the VSWR characteristic tuning scheme according to the characteristics of the present disclosure, a VSWR tuning operation may be performed in a relatively fine range. However, the fine tuning operation can be very useful in real environment.

In more detail, it is usual that the base station main body is provided in a proper position during an initial installation of the base station system, the antenna is installed in the pillar, and then the antenna (and an RRH) is connected to the base station main body through the feeder cable. However, even when performances or characteristics of all equipments are individually satisfied with a reference value, the VSWR is occasionally measured to be in the abnormal state in the case in which these are finally connected. This is largely attributed to an accumulation tolerance as the equipments are manufactured by different manufacturers. In this event, a problem may be solved by a specific fine adjustment.

Likewise, the VSWR characteristic may be out of the normal range by structures/performances of antenna internal equipments and a fine change of a connection state between the equipments not only during the initial installation but also user environment changes (climate changes such as temperature and weather). In this event, as described above, a problem may be solved by a configuration and an operation according to characteristics of the present disclosure.

Figure 4:
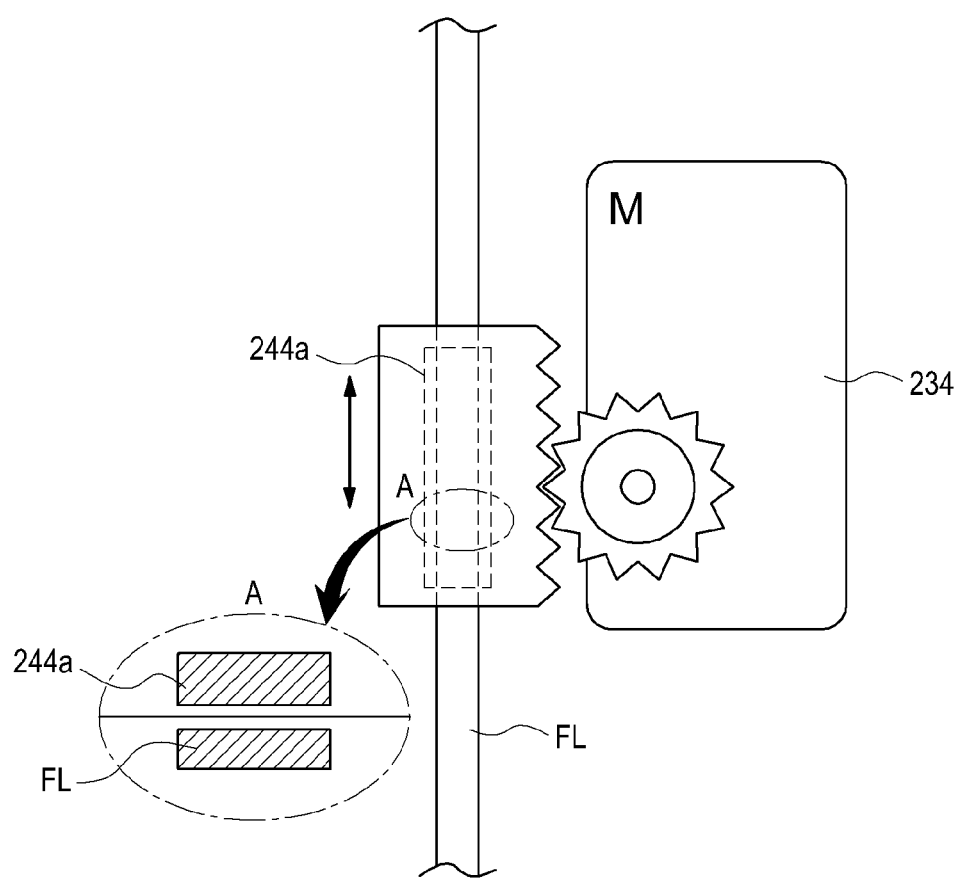
FIG. 4 illustrates a second example detailed structure of a VSWR conversion unit and a driving unit in FIG. 1.

FIG. 4 illustrates a second example detailed structure of a VSWR conversion unit and a driving unit in FIG. 1. Referring to FIG. 4, a VSWR conversion unit according to another embodiment of the present disclosure includes a dielectric 244a having a high dielectric constant, which puts on in a Feeding Line (FL) connected to a radiation element(s) in an antenna; and a dielectric moving unit 244 which supports the dielectric 244a and is configured to be movable according to the FL by an operation of a driving motor 234 which is a main element of the driving unit 23. An "A" area which is enlarged by a circular one-dot-broken line in FIG. 4 illustrates a side structure of the dielectric 244a and the Feeding Line (FL) which are in the dielectric moving unit.

When a movement direction of the dielectric moving unit 244 is configured to move according to a direction on which the FL puts, a rotational force by the driving motor 234 may be configured to move the dielectric moving unit 244 using a rack and pinion gear structure. According to the movement of the dielectric moving unit 244, a high impedance region corresponding to the dielectric 244a in the FL is changed and a distance of a signal path on the FL in the front end portion and rear end portion of the high impedance region is changed. Through the structure, a frequency matching is performed with reference to the VSWR.

Figure 5:
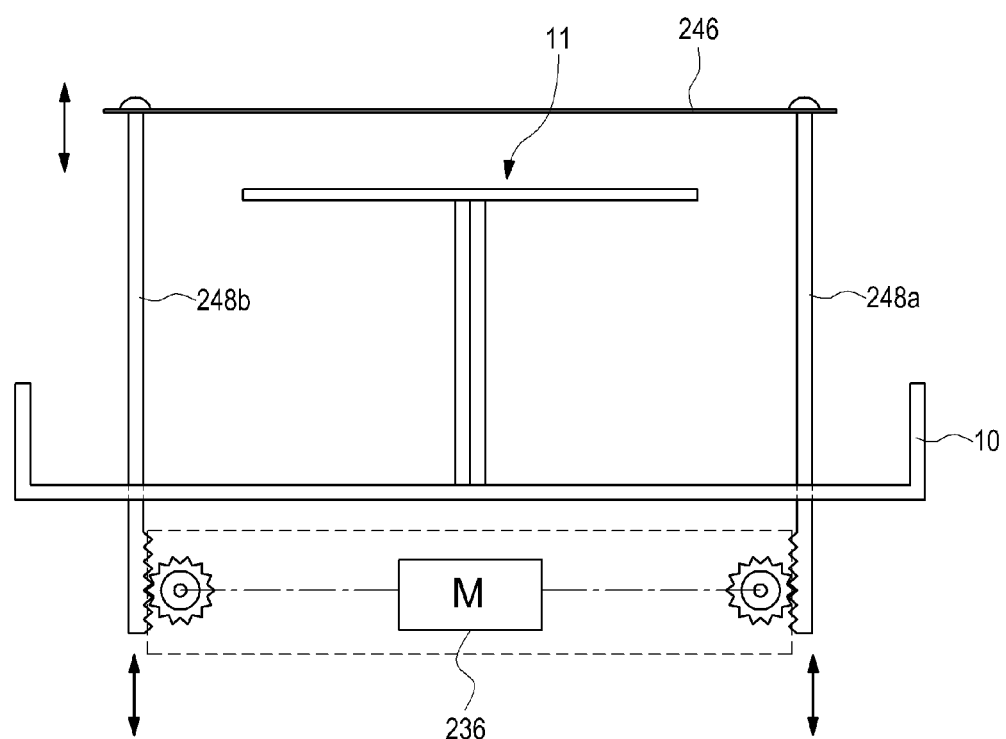
FIG. 5 illustrates a third example detailed structure of a VSWR conversion unit and a driving unit in FIG. 1.

FIG. 5 illustrates a third example detailed structure of a VSWR conversion unit and a driving unit in FIG. 1. Referring to FIG. 5, a VSWR conversion unit according to another embodiment of the present disclosure includes: a beam forming aiding material 246 installed in an appropriately spaced distance in a radiation direction of each radiation element 11 of a base station antenna; and movement support parts 248 (248a and 248b) which support the beam forming aiding material 246 to be movable so as to be near or be away from the radiation element 11, and is configured to move the beam forming aiding material 246 by an operation of a driving motor 236 which is a main element of the driving unit 23.

The bean forming aiding material 246 may be configured by, for example, an overall circular thin metal body. When an object having a dielectric constant puts on a region to which a beam radiates from the radiation element 11, the beam forming aiding material 246 may be included for extending beam width using a principle by which a radiation pattern of the beam changes. In this event, transmission and reception characteristics of the radiation element 11 are changed when the space between the beam forming aiding material 246 and the radiation element 11 is changed. Further, in the present disclosure, the transmission and reception characteristics of the radiation element 11 are changed using the beam forming aiding material 246, thereby performing a frequency matching operation with reference to the VSWR.

Technologies for the beam forming aiding material 246 include, for example, Korean Patent Application No. 2012-137901 (entitled "mobile communication station antenna with device for extending beam width", invented by MOON et al., and filed on Oct. 17, 2012) previously fined by the present applicant. Korean Patent Application No. 2012-137901 discloses technologies including an apparatus corresponding to a beam forming aiding material.

A configuration and operation of a voltage standing wave ratio tuning apparatus of a base station system in a wireless communication network according to an embodiment of the present disclosure may be performed. Meanwhile, a specific embodiment has been discussed in the description of the present disclosure, but various modified embodiments may be executed without escaping the scope of the present disclosure.

As described above, a voltage standing wave ratio tuning apparatus of a base station system in a wireless communication network may automatically optimize a VSWR matching with a base station antenna. That is, the apparatus according to the present disclosure may improve a variation of the VSWR, which can be randomly generated after an antenna is connected to feeder cables of equipment in a field, through an antenna internal tuning and improve a VSWR variation according to use environment changes (climate changes) as well as during the initial installation. As the VSWR matching is optimized in the present disclosure, a return loss decreases which aids in the overall efficiency and it is possible to reduce the occurrence of an alarm according to the VSWR reduction in the field.

Therefore, the present disclosure makes an operation for checking and replacing the base station antenna be unnecessary and can reduce the resource waste according to the replacement of the base station antenna.

What is claimed is:

1. A voltage standing wave ratio (VSWR) tuning apparatus of a base station system in a wireless communication network, the VSWR tuning apparatus comprising:
   a VSWR conversion unit that converts VSWR characteristics of the antenna by converting electrical signal transmission characteristics of an internal feed line by an external drive or converting radiation element transmission and reception characteristics;
   a driving unit that drives the VSWR conversion unit according to a control signal;
   a VSWR detection unit that generates a detection signal by detecting a VSWR of a corresponding installed antenna; and
   a controller that controls a conversion operation of the VSWR characteristics of the VSWR conversion unit by controlling an operation of the driving unit when it is determined that the VSWR characteristics are in an abnormal state according to the detection signal generated in the VSWR detection unit,
   wherein the VSWR conversion unit comprises:
      first and second stubs that are connected to a side of a Feeding Line (FL) connected to a radiation element; and
      first and second auxiliary lines that are connected to the first and second stubs, respectively, in a capacitance coupling scheme,
   wherein the first and second auxiliary lines are configured to be movable by the operation of the driving unit and the amount of the capacitance coupling between the first and second auxiliary lines and the first and second stubs, respectively, changes by the movement of the first and second auxiliary lines.

2. The VSWR tuning apparatus of claim 1, wherein the VSWR detection unit provides a VSWR detection signal to a base station main body and the controller controls the VSWR characteristic conversion operation by a command for a VSWR characteristic control provided from the base station main body.

3. A voltage standing wave ratio (VSWR) tuning apparatus of a base station system in a wireless communication network, the VSWR tuning apparatus comprising:
   a VSWR conversion unit that converts VSWR characteristics of an antenna by converting electrical signal transmission characteristics of an internal feed line by an external drive or converting radiation element transmission and reception characteristics;
   a driving unit that drives the VSWR conversion unit according to a control signal;
   a VSWR detection unit that generates a detection signal by detecting a VSWR of a corresponding installed antenna; and
   a controller that controls a conversion operation of the VSWR characteristics of the VSWR conversion unit by controlling an operation of the driving unit when it is determined that the VSWR characteristics are in an abnormal state according to the detection signal generated in the VSWR detection unit
   wherein the VSWR conversion unit comprises:
      a dielectric that puts on a Feeding Line (FL) connected to a radiation element and has a high dielectric constant; and
      a dielectric moving unit that supports the dielectric and is configured to be movable according to the FL by the operation of the driving unit.

4. A voltage standing wave ratio (VSWR) tuning apparatus of a base station system in a wireless communication network, the VSWR tuning apparatus comprising:
   a VSWR conversion unit that converts VSWR characteristics of an antenna by converting electrical signal transmission characteristics of an internal feed line by an external drive or converting radiation element transmission and reception characteristics; a driving unit that drives the VSWR conversion unit according to a control signal;
   a VSWR detection unit that generates a detection signal by detecting a VSWR of a corresponding installed antenna; and
   a controller that controls a conversion operation of the VSWR characteristics of the VSWR conversion unit by controlling an operation of the driving unit when it is determined that the VSWR characteristics are in an abnormal state according to the detection signal generated in the VSWR detection unit
   wherein the VSWR conversion unit comprises:
      a beam forming aiding material that is installed in a spaced distance in a radiation direction of the radiation element and is configured by a thin metal body; and
      a movement support part that movably supports the beam forming aiding material to be near or be away from the radiation element, and is configured to be movable the beam forming aiding material by the operation of the driving unit.

* * * * *